Patented Aug. 7, 1945

2,381,343

UNITED STATES PATENT OFFICE 2,381,343

MANUFACTURE OF IMPROVED HULLED RICE

Max Frank Furter, Upper Montclair, N. J., assignor to Hoffmann-La Roche, Inc., Nutley, N. J., a corporation of New Jersey No Drawing. Application December 23, 1941, Serial No. 424,113

3 Claims. (Cl. 99—11)

My invention deals with the manufacture of a product from hulled rice by which the valuable ingredients lost by the hulling will be restored to each grain of such rise and/or fortifying ingredients not present in the hull of the natural grain will be added.

My invention is particularly concerned with the manufacture of a greatly improved product from cleaned rice, which latter is of inferior nutritional value because it lacks the vitamin-carrying skin and germ components present in the natural brown rice of which components the brown rice has been deprived by the hulling process. I restore the vitamin component to the hulled rice by treating the latter with a solution of the restorative or fortifying ingredient and then enveloping the deposit of such material on the grain with a suitable coating material.

As far as I am aware, the art of improving hulled rice in the manner indicated is a novel one, and no prior attempts seem to have become known which have dealt with the particular problem of depositing and fixing a restorative and/or fortifying ingredient by the use of an enveloping skin on the hulled rice grain.

As is well known, the cleaning of the crude rice is done by pounding the dry grains and separating off from the milled product the rice dust which consists of husks and of broken grains. Then the dull-white stripped material is polished in order to improve its appearance.

I have contemplated and tested various methods of fixing such a skin to the hulled rice grain. While a number of methods and materials should apparently be useful for the formation of the skin on the grain, I have found that in designing a technically feasible process the greatest difficulty is encountered when attempting to develop cheap, simple means to deposit the restorative and/or fortifying substance on the rice grain and to envelope it with a protective skin in such a manner that the restorative and/or fortifying substance is distributed over the surfaces of the grains homogeneously, and that the appearance of the coated, dry rice is pleasing, each grain retaining its hard, compact, and polished structure. Where the added ingredient might be sensitive to heat and air, as, for instance, the vitamin $B_1$ present in the hulls of brown rice, I have also found it difficult to develop a fixing method and coating material which will permit the distribution of such sensitive substance over the grains in the necessarily finely divided form without substantial loss of the activity of the substance during the coating procedure, and to discover a skin forming material which will envelope such substance and keep it stable for all practically required periods of time before consumption of the rice.

The objects of my invention are therefore two-fold, namely, to determine the means which will accomplish the combination of these various requirements in an efficient manner well adaptable to the established working tools of the rice processing industry, and to provide the improved cleaned rice itself which will possess all of the desired qualities.

I have discovered that these objects can be accomplished if the vitamin or any other desired ingredient is first deposited on the surfaces of the rice grains and is then fixed by treating the grains with a polishing agent customarily employed for the polishing of stripped rice. The result is that the rice grains so treated retain their hard, compact surface structure which has a polished appearance, and contain the vitamin homogeneously distributed thereover.

In searching for a successful method of vitaminization, I have made the discovery, which is surprising in view of the sensitivity of vitamin $B_1$ to heat and air, that it is possible first to deposit the vitamin on the grains by treatment with an aqueous solution of the vitamin, followed by the polishing of this product with the dextrin-glucose syrup customarily used for the polishing of hulled rice.

It is well known that vitamin $B_1$ is readily destroyed by oxidation and exposure to continuous heating.

It is known also that the polishing process develops heat, as a result of which the temperature during polishing rises to from 40° to 60° C., and that this heat is distinctly "wet" due to the evaporation of water.

I have found that the vitamin $B_1$ does not suffer decomposition during the adsorption of the aqueous vitamin solution by the rice in the polishing vessel, and is not affected during the subsequent polishing procedure despite the fact that the vitamin is greatly exposed to the most damaging influences known to act adversely upon it, namely, "wet" heat in connection with extraordinary accessibility to oxidation as a result of the enormously fine subdivision of the vitamin over the surface of the rice grains. No losses in vitamin activity were noted either during or after vitaminization.

That the conditions of the adsorption and polishing procedure in my novel method should be particularly favorable to destruction of the vitamin by heat is clearly evidenced by the extremely fine subdivision of the vitamin containing adsorption liquid and of the polishing liquid during operation.

I have discovered that by first depositing the ingredient, such as vitamin $B_1$, on the rice, the surfaces of the grains adsorb and strongly withhold the ingredient, thus resulting in an excellent fixation on the surface, which can further be improved by enveloping the adsorbed ingredient in the polishing substance, as above described, or by coating it with a skin of a difficultly water soluble substance, such as gelatin or acetyl cellulose. The gelatine coating can be hardened by a chemical treatment, for instance, with acetaldehyde.

The above described methods can be employed to fix other ingredients upon the hulled rice grains, such as water soluble vitamins, as, for instance, vitamin C, vitamin $B_2$, nicotinic acid, nicotinic acid amide, pantothenic acid, pyridoxine, biotine, p-amino benzoic acid, and other water soluble vitamins or vitamin-like substance, or other water soluble ingredients of nutrient or medicament character, such as iron salts, bromides, calcium salts, hormones or vitamin or hormone-containing extracts; or alcohol soluble vitamins, such as, for instance, vitamin A, vitamin B, vitamin E or vitamin-like substances, or hormones, or vitamin or hormone-containing extracts. Also dyestuffs may be incorporated to improve the appearance of the finished rice grain or to serve for identification purposes. Also suitable mixtures of the above identified water and/or alcohol soluble ingredients can be employed.

Example 1

0.6 g of vitamin $B_1$ are dissolved in 500 cc. of distilled water. This solution is slowly dropped during a period of from about 5 to 8 minutes onto 100 kg. of hulled rice while the rice is rapidly stirred. After completion of this addition, stirring is continued until the rice appears completely dried by the frictional heat developed during stirring. This procedure consumes from about 8 to 10 more minutes. Thereupon, 350 cc. of a glucose-dextrin solution, specific weight 1.236, is dropped in and the polishing continued in the usual manner until the rice acquires a hard, compact, polished surface.

Example 2

To 100 kg. of hulled and polished rice, which is vigorously stirred in a suitable agitating vessel, there are added 0.6 g. of vitamin $B_1$ dissolved in 500 cc. of distilled water by spraying this solution into the agitated mass of rice grains. A period of about 10 minutes elapses until the vitamin is homogeneously distributed in the mass and the rice grains have completely dried. Thereupon, while containing the stirring the rice is mixed with 2000 cc. of a 15% gelatine solution within about 8 minutes, and stirring is continued until the rice grains are homogeneously covered with a thin, dry gelatine skin.

In both examples the completeness of the adsorption of the vitamin $B_1$ and its homogeneous distribution can be analytically determined. What I claim is:

1. A method of improving hulled rice which comprises vigorously stirring the rice, admixing thereto a solution of vitamin $B_1$, continuing the stirring until the vitamin content of the solution is adsorbed on the surface of the rice and the solvent is dried by the frictional heat developed by the stirring, thereafter adding a solution of a film-forming, water-soluble substance, and continuing the stirring until formation of the film on the rice grains is complete.

2. The method of improving hulled rice set forth in claim 1, in which the film-forming, water-soluble substance is gelatin.

3. The method of improving hulled rice set forth in claim 1, in which the film-forming, water-soluble substance dextrin-glucose.

MAX FRANK FURTER.